(12) United States Patent
Dedenok et al.

(10) Patent No.: US 11,539,726 B2
(45) Date of Patent: Dec. 27, 2022

(54) SYSTEM AND METHOD FOR GENERATING HEURISTIC RULES FOR IDENTIFYING SPAM EMAILS BASED ON FIELDS IN HEADERS OF EMAILS

(71) Applicant: AO Kaspersky Lab, Moscow (RU)

(72) Inventors: Roman A. Dedenok, Moscow (RU);
Dmitry S. Golubev, Moscow (RU);
Petr A. Salnikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 17/489,948

(22) Filed: Sep. 30, 2021

(65) Prior Publication Data

US 2022/0021692 A1  Jan. 20, 2022

Related U.S. Application Data

(63) Continuation of application No. 16/514,200, filed on Jul. 17, 2019, now Pat. No. 11,165,792.

(30) Foreign Application Priority Data

Mar. 29, 2019 (RU) .......................... RU2019109174

(51) Int. Cl.
*H04L 29/06* (2006.01)
*H04L 9/40* (2022.01)
(Continued)

(52) U.S. Cl.
CPC .......... *H04L 63/1416* (2013.01); *H04L 51/18* (2013.01); *H04L 51/212* (2022.05)

(58) Field of Classification Search
None
See application file for complete search history.

(56) References Cited

U.S. PATENT DOCUMENTS 7,636,716 B1   12/2009   Cheng
8,271,588 B1 *  9/2012   Bruno .................... H04L 51/12
                                                    709/206

(Continued)

OTHER PUBLICATIONS

Pu, Shi & Tan, Cheng-Chung & Liu, Jyh-charn. (2009). SA2PX: A Tool to Translate SpamAssassin Regular Expression Rules to POSIX. (Year: 2009).*

*Primary Examiner* — Jeffery L Williams
(74) *Attorney, Agent, or Firm* — ArentFox Schiff LLP; Michael Fainberg

(57) ABSTRACT

Disclosed herein are systems and methods for generating heuristic rules for identifying spam emails based on fields in headers of emails. In one aspect, an exemplary method comprises, collecting statistical data on contents of a plurality of emails; analyzing the statistical data to identify different types of content, including headers or hyperlinks in said emails; grouping the emails into clusters based on types of content identified in said emails, wherein at least one cluster group being based on fields in headers of said emails; generating a hash from the most frequent combination of group of data in each cluster; formulating regular expressions based on analysis of hyperlinks of emails corresponding to the generated hashes; and generating heuristic rule for identifying spam emails by combining the hashes and the corresponding regular expressions, wherein the hash is generated based on fields in the headers of said emails.

20 Claims, 5 Drawing Sheets

(51) Int. Cl.
*H04L 51/18* (2022.01)
*H04L 51/212* (2022.01)

(56) References Cited

U.S. PATENT DOCUMENTS

| | | |
|---|---|---|
| 8,495,144 B1 | 7/2013 | Cheng et al. |
| 8,738,721 B1 | 5/2014 | Smirnov et al. |
| 2005/0005145 A1* | 1/2005 | Teixeira ............... G06Q 20/382 |
| | | 713/193 |
| 2006/0168006 A1 | 7/2006 | Shannon et al. |
| 2006/0277264 A1* | 12/2006 | Rainisto .................. H04L 51/12 |
| | | 709/206 |
| 2007/0079379 A1* | 4/2007 | Sprosts ................... H04L 51/34 |
| | | 726/24 |
| 2012/0030293 A1 | 2/2012 | Bobotek |
| 2017/0093771 A1 | 3/2017 | Gatti et al. |
| 2020/0396258 A1* | 12/2020 | Jeyakumar .......... H04L 63/1416 |

* cited by examiner

X-Account-Key: account3
X-UIDL: 115393
X-Mozilla-Status: 0011
X-Mozilla-Status2: 00000000
X-Mozilla-Keys:
Received: from hqmailmbx3.avp.ru (10.64.67.243) by hqmailmbx1.avp.ru (10.64.67.241) with Microsoft SMTP Server (version=TLS1_2,
cipher=TLS_ECDHE_RSA_WITH_AES_128_CBC_SHA256_P256) id 15.1.1466.3 via Mailbox
Transport; Fri, 23 Nov 2018 14:44:26 +0300

Received: from hqmailmbx1.avp.ru (10.64.67.241) by hqmailmbx3.avp.ru (10.64.67.243) with Microsoft SMTP Server (version=TLS1_2, cipher=TLS_ECDHE_RSA_WITH_AES_128_CBC_SHA256_P256) id 15.1.1466.3; Fri, 23
Nov 2018 14:44:25 +0300

Received: from hqmailmbx1.avp.ru ([fe80::4094:410a:ddbc:4bd6]) by hqmailmbx1.avp.ru
([fe80::4094:410a:ddbc:4bd6%23]) with mapi id
15.01.1466.003; Fri, 23 Nov 2018 14:44:25 +0300

From: User_1 Name <User_1.Name@kaspersky.com>
To: User_2 Name < User_3.Name@kaspersky.com>, "User_3.Name" <User_3.Name@kaspersky.com>,
CC: User_4 Name <User_4.Name@kaspersky.com>

Subject:
 =?koi8-r?B?UkU6IMnExdE6IPPJ09TFzcEg0M/T1NLPxc7J0SDBztTJLdPQwc0g3NfSydPU?=
=?koi8-r?B?ycsgzsEgwsHaxSDQz9PMxcTP18HUxczYzs/T1Mkg2sHHz8zP18vP1yDQydPY?=
=?koi8-r?Q?=CD=C1?=
Thread-Topic:
 =?koi8-r?B?ycTF0Tog88nT1MXNwSDQz9PU0s/FzsnRIMHO1Mkt09DBzSDc19LJ09TJyyDO?=
=?koi8-r?B?wSDCwdrFlNDP08zFxM/XwdTFzNjOz9PUySDawcfPzM/Xy8/XINDJ09jNwQ==?=

Thread-Index: AdSAw1jXzqO2Tb3hQlui7v1p8RCynAArdRaAAGu72TA=

Date: Fri, 23 Nov 2018 14:44:25 +0300

Message-ID: <46ae460072c44fd0b01fde4b3d702a57@kaspersky.com>
References: <f3317661a18e4da9a5bdbc74b7691150@kaspersky.com>
 <3af4a1bc-2b3d-8ec3-d0d4-81f7018c196e@kaspersky.com>
In-Reply-To: <3af4a1bc-2b3d-8ec3-d0d4-81f7018c196e@kaspersky.com>
Accept-Language: ru-RU, en-US
Content-Language: en-US
X-MS-Exchange-Organization-AuthAs: Internal
X-MS-Exchange-Organization-AuthMechanism: 04
X-MS-Exchange-Organization-AuthSource: hqmailmbx1.avp.ru
X-MS-Has-Attach: yes
X-MS-Exchange-Organization-Network-Message-Id:
 0bf68307-1631-4b1b-3a45-08d651390508
X-MS-Exchange-Organization-SCL: -1
X-MS-TNEF-Correlator:
X-MS-Exchange-Organization-RecordReviewCfmType: 0
Content-Type: multipart/mixed;
 boundary="_006_46ae460072c44fd0b01fde4b3d702a57kasperskycom_"
MIME-Version: 1.0

{"ff": "false", "rh": "false", "so": "false", "fns": "false", "ftd": "false", "gob": "false", "ips": [{"sender_ip": "78.96.81.198"}], "luh": "false", "noq": "false", "nvf": "false", "opr": "false", "pbh": "false", "rah": "false", "rph": "false", "tel": "89254610709;89254610709;", "twt": "false", "whc": "false", "atrp": "false", "hetg": "0", "hnot": "0", "lurl": "false", "mole": " Produced By Microsoft MimeOLE V16.4.3528.331", "n_sh": "false", "rate": 100, "u_sd": "false", "urls": [], "xmlr": " Microsoft Windows Live Mail 16.4.3528.331", "e_kas": "false", "hnctt": "0", "msgid": "none", "noref": "false", "ptags": "0", "rules": [{"rule_id": "sr_5088022_p1"}], "t_cnt": "68", "app_id": "1463", "attach": "none", "bld_pc": "0.24", "brtags": "12", "method": "102", "status": 3, "vt_cnt": "8", "azombie": "none", "charset": "none", "db_time": "1513284395", "ext_env": 0, "hdr_seq": "ftsmc", "last_ip": "78.96.81.198", "ms_html": "false", "rcv_fld": 1, "urlsQty": 0, "env_type": 0, "first_ip": "78.96.81.198", "hdr_seq2": "from:to:subject:date:content-type:x-mailer:", "http_inv": "0", "msg_size": "8893", "sdk_html": "1261087055", "shingles": "1604547d,48ef27bd,a00dfb47,1c154a49,2718daa3,54cd62e6,858150c6,a51af717,da33e732, 12a78697,4994e772,5a457af8,bbe5a50e,cfefd9ad,374eec91,30401d09,640368f8,d76259f0,63314b4b,1604547d,48ef27bd,a00dfb47,1 c154a49,2718daa3,54cd62e6,858150c6,a51af717,da33e732,12a78697,4994e772,5a457af8,bbe5a50e,cfefd9ad,374eec91,30401d09, 640368f8,d76259f0,63314b4b", "headermd5": "c6a450852e4bb6611751a33b632b3347", "short_url": "false", "style_cnt": "9", "to_quaran": 0, "upcase_pc": 0, "categories": "Content/Escalation1/Events/Seminar; Content/Other/GetMoney/GetSynonyms; Content/Seminar/SeminarWeak; Internal-LGS > RL", "msgid_dext": "no", "msgid_info": "0,0,0,0,0", "msgid_type": "no_msgid", "s_html_md5": "fd27dcefd9f7dd22c6982bb1db9aa387", "from_quaran": 0, "mailer_name": "microsoft", "rcv_ip_type": "ord", "subject_len": "81", "subject_md5": "b94dacc31fb73a24a8ede12aff1ef053", "to_crc_user": "0xCB893157", "content_type": "multipart/ alternative", "msgid_domain": "none", "msgid_errors": "none", "msgid": "sget_lang_id": 0, "boundary_info": "41,1,4,4,1", "boundary_type": "outlook_boundary", "html_full_md5": "ad18037f1e5247d2613eaee1c691882f", "msg_body_size": "8217", "s_html_md5_sz": "2224", "sender_ip_num": 1, "to_crc_domain": "0x69413EAE", "sget_msgid_low": 3575667364, "sget_stream_id": 13, "useragent_type": "none", "sget_msgid_high": 699509781, "smtp_from_domain": "NOON.fr", "header_from_domain": "NOON.fr", "inner_content_type": "text/ plain,text/html", "smtp_from_user_crc": "0xCB893157", "header_from_user_crc": "0xCB893157", "header_from_org_domain": "NOON.fr"}

SYSTEM AND METHOD FOR GENERATING HEURISTIC RULES FOR IDENTIFYING SPAM EMAILS BASED ON FIELDS IN HEADERS OF EMAILS

CROSS REFERENCE TO RELATED APPLICATIONS

The present application is a continuation of U.S. application Ser. No. 16/514,200, filed on Jul. 17, 2019, which claims priority to Russian Patent Application No. 2019109174, filed on Mar. 29, 2019, the entire contents of which are incorporated herein by reference.

FIELD OF TECHNOLOGY

The present disclosure relates to the field of computer security, more specifically, to systems and methods of identifying spam emails based on fields in headers of emails.

BACKGROUND

At present, there is a growing need for providing data and computer security. When users receive unsolicited or unwanted content, security may be compromised and fraudulent activity may follow. One way to send the unsolicited or unwanted content is using spam emails, a type of electronic content sent via email for the purpose of advertising a particular product or service and for the purpose of committing fraudulent actions. Today, there are many technologies available for sending spams. For example, spam emails may be sent using proxy servers, free email servers that enable the emails to be sent in an automated manner, botnets, and the like. In another example, the spam may be sent with the aid of instant messaging protocols in social networks, blogs, forums, dating sites, etc. In yet another example, spam may be distributed using Short Message Service (SMS) or Multimedia Messaging Service (MMS) messages.

To illustrate the impact of spam in modern communication, emailed spam amounts to 70-90% of total email traffic volume. Such a quantity of spam sent by computer networks causes major inconveniences to users of email. In particular, spam reduces the bandwidth of the networks, wastes resources of the message exchange systems, and increases processing time for emails, both by users and by computers. Thus, spam must be constantly combated by users.

Various mechanisms have been developed for combating spam, such as creating black lists of spam senders, creating gray lists of senders requiring repeated access to a mail server for sending spam, context filtering of spam, etc. As a rule, spam filtering focuses on analysis of the content of the email message. Methods based on filtering generally require an exact match in order to find and distinguish emails containing spam from legitimate emails. Unfortunately, the analysis of content introduces other issues. First, a substantial analysis requires significant amount of time, which would slowdown email processing. Bulk spam mailing further aggravates the impact on processing time. Second, the analysis requires opening all emails to access information. Such access is not permitted in most cases, unless the consent of the user is received prior to the email being sent. Moreover, in some instances, the email may contain confidential information.

One approach to increase the effectiveness of spam filtering is to reduce the extensiveness of the analysis or to introduce a preliminary analysis. The reduction in analysis may be based on analysis of email headers instead of the entire emails. For example, email headers and characters of the headers used to compose the headers may be analyzed. However, current technologies based on analysis of headers do not contain effective mechanisms that can simultaneously analyze rapidly and obtain statistically accurate results. For example, when a probability of occurrence of errors of a first kind (i.e., false alarms) is greater than a predetermined threshold, legitimate emails may be classified as spam at a level that is unacceptable. The legitimate emails that are classified as spam may be placed in quarantine or automatically deleted, in some systems, without notifying the sender and/or the recipient. Hence, the misclassification may result in a loss of legitimate emails. One way to reduce the false alarms is to use a different threshold that may allow spams to get through the filter. Unfortunately, senders of spam are also increasingly becoming inventive and continue to strive to take account of the various known spam filtering mechanisms. For instance, the spam may avoid automatic detection by adding, to the content of emails, either randomization or data that is similar to legitimate emails.

Therefore, there is a need to improve detection schemes, e.g., employ an analysis of statistical data on emails received by users in order to effectively detect spam while simultaneously maintaining the confidentiality of the content of the emails. That is, there is a need for identifying the emails that contain spam without an analysis of the text contained in the bodies of the emails.

SUMMARY

Aspects of the disclosure relate to the field of computer security, more specifically to systems and methods of generating heuristic rules for identifying spam emails based on fields in headers of emails.

In one exemplary aspect, a method for generating heuristic rules for identifying spam emails based on fields in headers of emails is implemented in a computer comprising a hardware processor, the method comprising: collecting statistical data on contents of a plurality of emails; analyzing the collected statistical data to identify different types of content of said emails, including one or more of headers or hyperlinks in said emails; grouping the plurality of emails into one or more clusters based on the different types of content identified in said emails, wherein at least one cluster includes one or more groups based on fields in headers of said emails; selecting at least one most frequent combination of groups of data in each cluster; generating a hash from the at least one most frequent combination of groups; formulating at least one regular expression based on an analysis of hyperlinks of the emails corresponding to the generated hashes; and generating at least one heuristic rule for identifying spam emails by combining at least one hash and the corresponding regular expression, wherein the at least one hash is generated based on fields in the headers of said emails.

According to one aspect of the disclosure, a system is provided for generating heuristic rules for identifying spam emails based on fields in headers of emails, the system comprising a hardware processor configured to: collect statistical data on contents of a plurality of emails; analyze the collected statistical data to identify different types of content of said emails, including one or more of headers or hyperlinks in said emails; group the plurality of emails into one or more clusters based on the different types of content identified in said emails, wherein at least one cluster includes one or more groups based on fields in headers of said emails; select at least one most frequent combination of groups of data in each cluster; generate a hash from the at least one most frequent combination of groups; formulate at least one regular expression based on an analysis of hyperlinks of the emails corresponding to the generated hashes; and generate at least one heuristic rule for identifying spam emails by combining at least one hash and the corresponding regular expression, wherein the at least one hash is generated based on fields in the headers of said emails.

In one exemplary aspect, a non-transitory computer-readable medium is provided storing a set of instructions thereon for generating heuristic rules for identifying spam emails based on fields in headers of emails, comprising instructions for: collecting statistical data on contents of a plurality of emails; analyzing the collected statistical data to identify different types of content of said emails, including one or more of headers or hyperlinks in said emails; grouping the plurality of emails into one or more clusters based on the different types of content identified in said emails, wherein at least one cluster includes one or more groups based on fields in headers of said emails; selecting at least one most frequent combination of groups of data in each cluster; generating a hash from the at least one most frequent combination of groups; formulating at least one regular expression based on an analysis of hyperlinks of the emails corresponding to the generated hashes; and generating at least one heuristic rule for identifying spam emails by combining at least one hash and the corresponding regular expression, wherein the at least one hash is generated based on fields in the headers of said emails.

In one aspect, the regular expressions are formulated by: combining hyperlinks into regular expressions according to lengths of the hyperlinks, wherein only identical values of the hyperlinks being combined remain in the regular expression.

In one aspect, the generation of the at least one hash further comprises: determining whether or not at least one set of groups of the cluster has reached a predetermined threshold, and combining a plurality of the hashes of the cluster when the predetermined threshold is not reached.

In one aspect, the combining of the plurality of the hashes is performed using an or operation.

In one aspect, the generation of the at least one hash further comprises: determining whether or not the generated at least one hash matches a hash stored in a database, and when the generated at least one hash matches a hash stored in the database, discarding the generated hash such that the hash is not considered for generating the at least one heuristic rule.

In one aspect, the at least one additional condition for the generating of the at least one heuristic rule is formed based on numbers of hyperlinks contained in bodies of emails that correspond to the cluster for which the hash was formed.

In one aspect, the at least one additional condition for the generating of the at least one heuristic rule is formed based on information contained in all the emails corresponding to the cluster for which the hash was formed.

In one aspect, the method further comprises: automatically identifying an event indicating a need to generate the heuristic rule, the event indicating at least one of: gathering a predetermined volume of statistical data, determination of at least one false alarm of the heuristic rule on one or more devices of clients, determination of a need to convert at least one previously created cluster.

The identification of spam emails that contain unwanted or unsolicited content in accordance with the teachings of the present disclosure improves computer security. The present invention is able to solve the aforementioned drawbacks and problems by creating heuristic rules and checking emails for the presence of spam, wherein the heuristic rules enable an analysis of a sequence of fields of an email header of the email being checked. The improvement is achieved by: collecting statistical data on contents of a plurality of emails; analyzing the collected statistical data to identify different types of content of said emails, including one or more of headers or hyperlinks in said emails; grouping the plurality of emails into one or more clusters based on the different types of content identified in said emails, wherein at least one cluster includes one or more groups based on fields in headers of said emails; selecting at least one most frequent combination of groups of data in each cluster; generating a hash from the at least one most frequent combination of groups; formulating at least one regular expression based on an analysis of hyperlinks of the emails corresponding to the generated hashes; and generating at least one heuristic rule for identifying spam emails by combining at least one hash and the corresponding regular expression, wherein the at least one hash is generated based on fields in the headers of said emails.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 illustrates an example of data obtained from an email of a user, where the data correspond to the header of the email.

FIG. 3 illustrates an example of a statistical data obtained from a header of an email and converted to a particular form.

DETAILED DESCRIPTION

Exemplary aspects are described herein in the context of a system, method, and a computer program for forming heuristic rules for identifying spam emails. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

An email refers to a mail transmitted electronically having a definite structure. Therefore, special programs supporting a structure, e.g., a structure of the email, are used to write the email. The structure consists of two parts: a header and a body of the email.

In turn, the header contains a series of fields designed to be filled out, each field being defined by its own name (a field of the header of the email) and a respective value. The value of a field of the series of fields contains a particular kind of information. For example, for the field designed to indicate the sender of the email, the name is "from", and the value will have the form of an email address of the sender, such as username@kaspersky.com. Examples of the other fields of the header of the email are:

Sender—the sender of the email, usually analogous to the "From";
To—the name and email address of the recipient, a mandatory field to be filled in;
Subject—the topic of the email, not a mandatory but a desirable field to be filled in;
Cc (CarbonCopy)—the addresses of other subscribers receiving copies of the message;
Date—the date and time of sending of the message;
Reply-to—email addresses to which a reply is sent (they may be different from the address of the sender);
Received—various Internet servers relaying the message from the sender to the recipient;
Subject—the content of the message being sent;
Content-type—the format for composition of the message being sent and the encoding in which the email is created;
Content-Transfer-Encoding—the method of data transfer (7th, 8th bit message and so on);
Message-ID—the unique identifier of the message; and
X-mailer—an email message transmittal program.

Typically the size of the email must not exceed certain values, such as 500 kb or 2 Mb and so forth. For example, certain email servers do not relay emails larger than 1 Mb.

Figure 1:
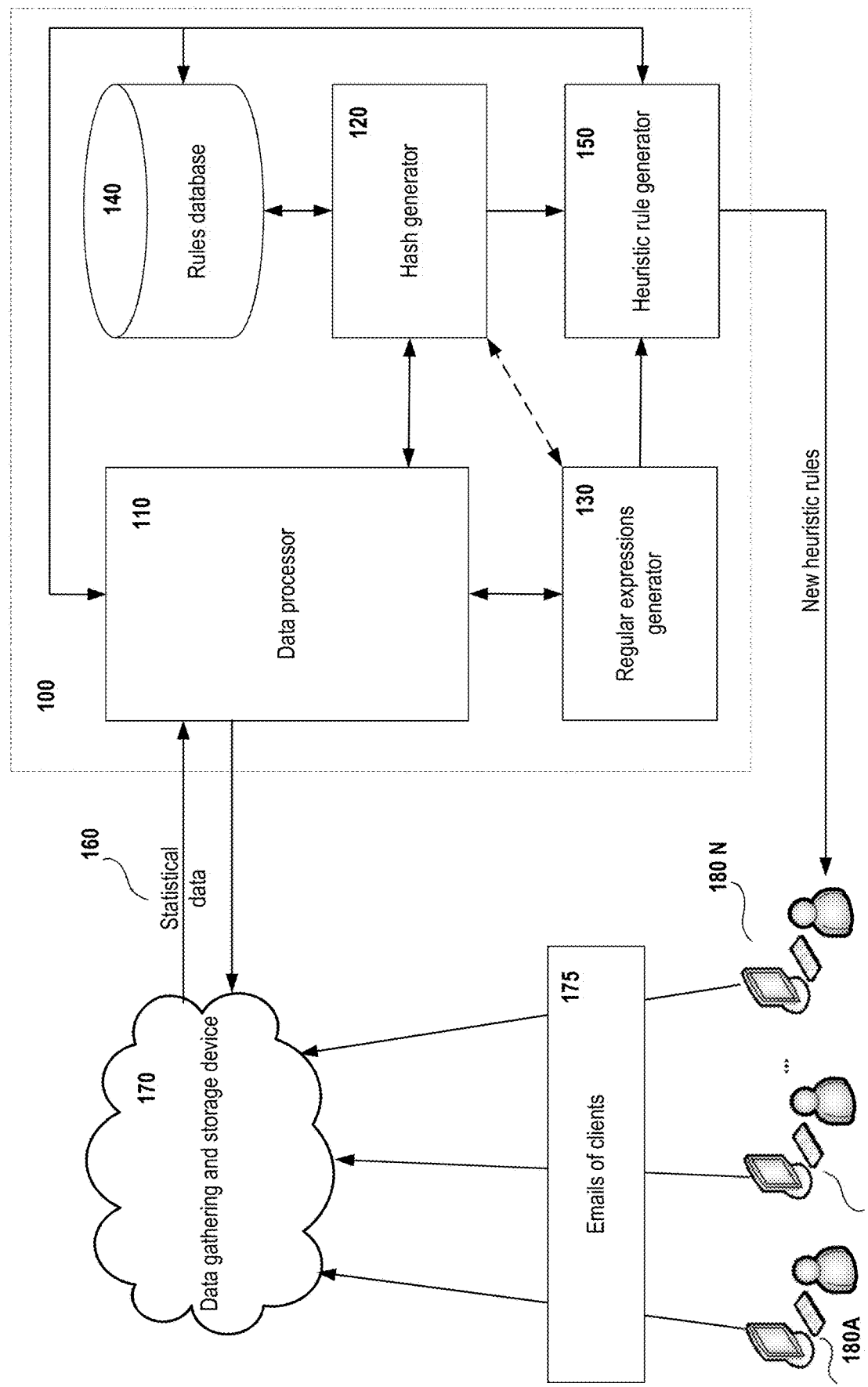
FIG. 1 is a block diagram illustrating an exemplary system for forming heuristic rules for identifying emails including unwanted content in accordance with aspects of the present disclosure.

FIG. 1 is a block diagram illustrating an exemplary system 100 for forming heuristic rules for identifying spam emails in accordance with aspects of the present disclosure. As used in the present disclosure, the term "spam email" includes, but not limited to, unsolicited or unwanted messages sent in bulk by email to one or more recipients.

The system 100 includes at least a data processor 110, a hash generator 120, a regular expression generator 130, a rules database 140, a heuristic rules generator 150. The system 100 forms heuristic rules by: obtaining statistical data 160 from a data gathering and storage device 170, and processing and analyzing the obtained statistical data 160.

The hash generator 120 may be an MD5 hash generator that takes a string of any length and generates a 128 bit hash. Note that MD5 hash is not an encryption; rather it is a hash of a given input designed to be hard to reverse engineer to identify the original string.

In one aspect, the data gathering and storage device 170 comprises a cloud server. For example, referring to FIG. 1, the cloud server performs the gathering and storing of data on emails 175 of email clients 180A, 180B, . . . , 180N. The term "cloud server" refers to, for example, a device/server including the Kaspersky Security Network (KSN) system of the company "Kaspersky Lab AO". The term "client" refers to an email client of the user, established on the computers of the user or the email server(s) of the user. For example, in FIG. 1, the clients 180A, 180B, . . . , 180N are email clients of the user. It should be noted that the data gathering and storage device 170, during the gathering of data on emails of the clients, does not gather and maintain identifiable data. Thus, the data gathering and storage device 170 may be configured either to not gather information relating to the user, or to depersonalize gathered information so that the information is no longer identifiable. Depersonalization refers to a transformation of information, for example, with the aid of a hash function. The information from the body of the email, e.g., text messages of the users, and from the header of the email, e.g., email addresses, are either depersonalized or not gathered at all. For the depersonalization of the information, each client 180 contains an agent (as shown in FIG. 1) which transforms the email before sending it to the data gathering and storage device 170.

FIG. 2 illustrates an example 200 of data obtained from an email of a user, where the data correspond to the header of the email. The data is transformed and is being sent to the data gathering and storage device 170. In other words, a portion of the information on one email (the header) which has been transformed is being sent to the data gathering and storage device 170. The header of the email contains a series of technical data and fields of the header of the email, such as: From, To, CC, Subject Message-ID and Content-Type, as well as hidden values of those fields. The storing and transmittal to the system 100 of the information about the collected emails is done in the form of statistical data 160. The data gathering and storage device 170 forms the statistical data on each email by yet another transformation of the data being collected from clients. In one aspect, the statistical data 160 is formed on the basis of a transformation of the emails being collected from the clients with the aid of lexical analysis. An example of such a transformation is presented in FIG. 3.

FIG. 3 illustrates an example 300 of a statistical data obtained from a header of an email and converted to a particular form, e.g., anonymous form. For instance, information corresponding to the header of one email and the different fields of the header are transformed into anonymous form (i.e., a form that does not contain private or personal information of the clients). It should be noted that the body of the email will also be transformed. The statistical information on the body of the email contains only information on the Uniform Resource Locator (URL) address (also called hyperlinks) contained in the email, the various shingles which have been formed on the basis of the data of the email, and the category assigned to the email. In this regard, "category" refers to the internal email classification that is created. For instance, the classification may include categories such as spam, not spam, possibly spam, possibly spam with phishing elements, possibly spam with suspicious hyperlinks, and so on.

The data processor 110 receives the statistical data 160 on the emails and performs a primary analysis of the received statistical data 160. The primary analysis includes identifying various attributes in each email, where the attributes are at least: the sequence of fields of the header of the email (e.g., as shown in FIG. 3, selected text), hyperlinks from the body of the email, various identifiers (ID) and hash (e.g., md5) of the data of the email, and so forth. Next, the data processor 110 performs a clustering of the received statistical data 160, during which at least one cluster is formed on the basis of the identified data. Each formed cluster contains emails grouped according to particular data types. These data types (attributes) include at least the fields of the headers of the emails and their respective values.

In one aspect, the clustering of the statistical data 160 is done on the basis of a data clustering algorithm Density-Based Spatial Clustering of Applications with Noise (DBSCAN).

In one aspect, the grouping according to certain data types of the emails includes: forming a cluster from the fields contained in the header of each email. For example, suppose the groups for at least one cluster are the following email fields of the headers of the emails: "hdr_seq2", "boundary_type", "mailer_name", "msgid_type", "urlsQty", "content_type", "attach". Then, the email represented in the form of statistical data in FIG. 3 may be assigned to at least one cluster formed on the basis of the following fields: "hdr_seq2", "from", "to", "subject", "date", "content-type", and "x-mailer".

After forming the clusters, the hash generator 120 makes a selection of at least one most frequent combination of groups in each formed cluster, and transforms the found combination of groups into a hash. The combination of groups is at least a series of values of fields from the headers of the emails. The most frequent combination is the set of fields that brings together the largest number of emails among the emails being analyzed. The hash that is generated is understood to be at least an MD5, the hash or the flexible hash of the found combination of groups. It is possible to assign a threshold for the number of emails, upon crossing of which each combination of groups will be considered to be the most frequent. In this case, a further analysis will be done for all combinations of groups having crossed the threshold. For example, the threshold may be set at 80% of the total number of emails. It should be noted that if no combination of groups has reached the aforementioned threshold, the combination of groups closest to the given threshold will be selected.

In one aspect, the data processor 110 may perform a prioritization of the sets of groups when more than one set has been formed. The prioritization may be used to form heuristic rules for emails that contain spam and are often encountered. The prioritization parameter will be, for example, information on the assigned categories of emails from which the statistical data 160 was obtained, or any additional information that may be used to assess the importance of the emails.

To illustrate, consider an example of a search and a generation of a hash based on two emails. Suppose it is assumed that one email (M1) contains a sequence of fields of the header of the email, consisting of six fields: F1, F2, F8, F9, and F20, where F corresponds to the particular field of the header of the email, and the number indicates the type of field in the particular classification. The classification of the fields lies outside the bounds of the invention and is an input parameter. For example, F1 corresponds to the field "from", F2 to the field "to", F8 to the field "x-mailer", F9 to the field "cc" and F20 to the field "message-id". The other email (M2) contains the following fields: F1, F3, F5, F8, F9, F15 and F20. For each email the hash is unique and is formed on the basis of each sequence. For example, for the sequence F1F2F8F9F20 of email M1 the hash is formed: md5 (from:to:x-mailer:message-id:cc), which will have the following appearance: "c72c4c829a3863d1056634d3a306871f".

In one aspect, when clustering the N-th quantity of emails, for example hundreds of thousands, it is possible to form hashes of other hashes which were in turn formed from the most frequent groups, in order to capture the largest quantity of emails analyzed. For example, 10000 emails were analyzed, of which 2000 emails were combined into group 1 on the basis of the following fields of headers of the emails: F1:A1, F2:A2, F8:A8, F11:A11 (i.e., these headers are encountered in all 2000 emails) and 7500 emails were combined into group 2 on the basis of the following fields of the headers of the emails: F1:A1, F5:A5, F9:A9. Accordingly, for group 1 the hash "hash 1" was formed, and for group 2 the hash "hash 2". After this, yet another hash was formed by combining the two hashes so created, where the indicated hash is a flexible hash.

In another aspect, when not a single set of groups of the cluster has reached the given threshold, it is possible to combine several sets in order to cross the given threshold. For example, two or three hashes will be combined by the "or" sign. In this case, such a combination will also correspond to the attribute "hash" further in the text.

Next, the hash generator 120 makes a preliminary check for each selected hash in the collection of hashes belonging to the emails not containing spam, i.e., legitimate emails. It should be noted that the preliminary check may be both one of the main steps in forming a heuristic rule and also an optional or additional one. The collection of such hashes is stored in the database 140. If the selected hash matches up with a hash from the mentioned collection, the selected hash is discarded from the later process of forming the heuristic rule. Otherwise, if the selected hash did not match up with any hash from the mentioned collection, the hash will be sent to the heuristic rule generator 150, where the hash will be one of the mandatory conditions, and the hash generator 120 will inform the regular expression generator 130 as to the transmittal of the data. But if the preliminary check is not performed, it is considered that each hash did not match up with any hash from the mentioned collection.

In one aspect, the rules database 140 contains at least a set of hashes corresponding to legitimate emails, and a set of hashes corresponding to emails containing spam, and also a set of flexible hashes for both types of emails.

Then, the regular expression generator 130 formulates at least one regular expression on the basis of an analysis of the hyperlinks contained in the emails corresponding to each hash that was sent to the heuristic rule generator 150. In order to form the regular expression, data containing information about hyperlinks is identified from the statistical data obtained from each mentioned email. The data containing information about hyperlinks includes the hyperlinks, with each hyperlink, e.g., a URL, being a unique identifier of a resource located in an information network, such as the Internet. Another condition for the generation of the heuristic rule is a regular expression, which is a string specifying a rule for finding an indicated link.

In one aspect, the regular expression is formed as follows:

In a first step of the formation of the regular expression, the regular expression generator 130 breaks up each link identified from the statistical data into segments according to dividers contained in the link. The dividers include the following symbols: slash—'/', point—'.' and the symbol '@'. Next, the regular expression generator 130 determines the length of each link by counting the number of segments obtained after such division (i.e., after applying the dividers). For example, for the hyperlink: "http://app.ingos.ru/email/road_rules/?utm_source=newsletter&utm_medium=email&utm_campaign=digest_02_2019_feb&utm_content=road_rules&email=username@kaspersky.com" a division into eight segments may be performed, where the first segment is "app", the second segment is "ingos", the third segment is "ru", the fourth segment is "email", the fifth segment is "road_rules", the sixth segment is "?utm_source=newsletter&utm_medium=email&utm_campaign=digest_02_2019_feb&utm_content=road_ rules&email=username", the seventh segment is "kaspersky" and the eighth segment is "com". Thus, for this link the length is equal to eight.

In a second step of the regular expression formation, the regular expression generator 130 compares hyperlinks of the same length from different emails to one another, segment by segment, to form regular expressions corresponding to the hyperlinks of the given length. It should be noted that the emails correspond to the same cluster from which the hash was previously formed by the hash generator 120. The segments are compared according to their order, i.e., when comparing hyperlinks of identical length, the first segment of the first link from one email is compared to the first segment of the first link of the other email, and so forth. If the segments match up, then the set of symbols of the regular expression for that segment will correspond fully to that segment in unchanged form. Otherwise, if the segments are different, the segment of the regular expression will have the form [x]+, where x is the range containing symbols contained in both segments. Thus, when comparing hyperlinks of the same length of different emails, the result obtained is an N-th number of regular expressions.

In a third step of the formation of the regular expression, the regular expression generator 130 compares the regular expressions to each other. The comparison is done in the same way as in the previous step, namely, only regular expressions corresponding to hyperlinks of the same length are compared, while following a principle in which "the more general the regular expression, the larger the priority of the regular expression". Thus, the less general regular expression is eliminated from further analysis. As a result, a list is formed containing one regular expression each for the hyperlinks of each link length.

After forming the list of regular expressions, the regular expression generator 130 sends the list of regular expressions to the creating heuristic rules generator 150.

The heuristic rules generator 150 generates the heuristic rules on the basis of the data received from the hash generator 120 and the regular expression generator 130. The heuristic rules generator 150 determines the correspondence between each hash obtained from the hash generator 120 and the regular expressions obtained from the heuristic rules generator 150.

After determining their correspondence, the heuristic rules generator 150 combines them into a heuristic rule of the kind:

"
{Bind2(Functor1Equal,GetFullHeaderSeqMd5,
  '2521917f0470dc40b578ee99a45cfd')},
{BodyMatch, where='urls', regexp=[[\w+\.win/[a-z]+
  \.?$]]},
", where each rule contains at least two indicated mandatory conditions, the first condition corresponding to the hash of the sequence of fields of the header of the email, and the second condition corresponding to the regular expression corresponding to hyperlinks of a defined length.

In one aspect, the heuristic rules generator 150, when creating the heuristic rule, forms additional conditions in addition to the indicated conditions. The additional conditions are also formed on the basis of the statistical data 160, while allowing for the main conditions that are already created. Thus, for example, one of the additional conditions might be created on the basis of an analysis of at least one field of the header contained in the sequence of fields of the header of an email, on the basis of which the hash was formed for the first condition of the heuristic rule. Another additional condition might be created on the basis of an analysis of data obtained from the body of the email, such as the hyperlinks. The formulation of each additional condition is done analogously to the formulation of the first condition, namely, the hash. For this, the heuristic rules generator 150 interacts with the data processor 110. Thus, one type of field of the header of the email is selected for which a grouping will be done by clusters according to the values indicated in the corresponding field of the emails being analyzed. For example, if the email contains the field "Content-Type" or the field "X-mailer", then a grouping may be done on the basis of an analysis of the values of each field indicated in the emails being analyzed to enable the forming of additional conditions for evaluating the email for the presence of spam when creating the heuristic rule (an example is given below).

In another aspect of forming an additional condition, an analysis may be done for the body of the email. For example, the analysis may include determining the number of hyperlinks contained in the body of each email. Thus, the maximum and minimum number of hyperlinks are counted in the emails being analyzed. The emails correspond to the cluster from which the hash was formed for the mandatory condition. An additional condition is formed for the heuristic rule according to the count. Thus, the forming of additional conditions allows a minimizing of the likelihood of a false alarm during the fulfillment of the generated heuristic rule.

In a preferred aspect, the choice of attributes for forming of the additional conditions is done such that information about them was contained in all the emails corresponding to the hash. Let us assume that additional conditions for the heuristic rule have been formed on the basis of attributes from the above indicated examples.

Then, the heuristic rule might have the appearance:

"
{Bind2(Functor1Equal,GetFullHeaderSeqMd5,
  '25219f817f0470dc40b578ee99a45cfd')},
{Bind2(Functor1Equal,UrlsCountS,'1')},
{Bind2(Functor1Equal,GetBoundaryType,'no_boundary')},
{Bind2(Functor1Equal,GetMailerType,'none')},
{BodyMatch, where='urls', regexp=[[\w+\.win/[a-z]+
  \.?$]]},
", where the first condition states that the hash of the sequence of fields of the header of the email should correspond to the indicated Md5, the second condition states that the email should contain one hyperlink, the third condition states that the field "Content-type" lacks a boundary, the fourth condition states that the email lacks the field "X-mailer", and the fifth condition states that the hyperlink contained in the email comes under the indicated regular expression.

Thus, the heuristic rules generator 150 forms one rule for each previously created regular expression. After creating the heuristic rule, the heuristic rules generator 150 may additionally perform a verification thereof on additional collections of legitimate emails. If the heuristic rule is not triggered on the collections being verified, it will be sent to clients 180. Otherwise, if the heuristic rule is triggered, it will be discarded.

In yet another aspect, the heuristic rules generator 150 performs an evaluation of the rules created in order to identify at least one heuristic rule that covers the largest number of emails of the cluster. The evaluation is based on a comparing of the created rules with each other by the following approach:

(i) if the rules are described by the same regular expression, the conditions of the rules will be combined into a single rule by the "OR" symbol; and (ii) if the rules are described by different regular expressions, but other conditions match up, down to one, then the most preferred regular expression will be determined, where the most preferred regular expression will be the one which satisfies the criterion: coverage of N % of the emails in the cluster and a more strict form of the regular expression, the size of the coverage being the most important criterion. For example, if the rule with the more strict regular expression describes fewer than 90% of the emails than the other rule, this rule will be less preferred than the other rule, and accordingly rules with a less strict regular expression will be selected.

Thus, the less preferred rule is discarded, and the more preferable rule is compared to the remaining ones, with the result that there will remain at least one heuristic rule which describes the most completely a larger portion of the cluster used to formulate the hash (hash) in the rule by the hash generator 120, and the rule itself. After this, a verification of the rule may be done on the collection of legitimate emails.

It should be noted that the hash generator 120 and the regular expression generator 130 will exchange information during the performance of their functions as needed, for example, to send data on ready hashes for clusters and to send data relating to information for the forming of the regular expressions.

In one aspect, the system 100 is part of the data gathering and storage device 170 and, accordingly, it will perform the analysis of statistical data and formulation of the heuristic rules within the device 170.

In another aspect, the system 100 will automatically identify an event indicating the need to create a heuristic rule for the identification of spam emails being sent. Such events are at least events indicating the gathering of a certain volume of statistical data 160, the determination of a false alarm of the heuristic rule on devices of clients 180, the need to convert one of the previously created clusters and others. For this, the system 100 monitors the presence of such events from the devices of clients 180 by itself, or through the data gathering and storage device 170. Then the system 100 either requests the necessary data for the creating of heuristic rules or it obtains the data in parallel with the identified event.

Figure 4:
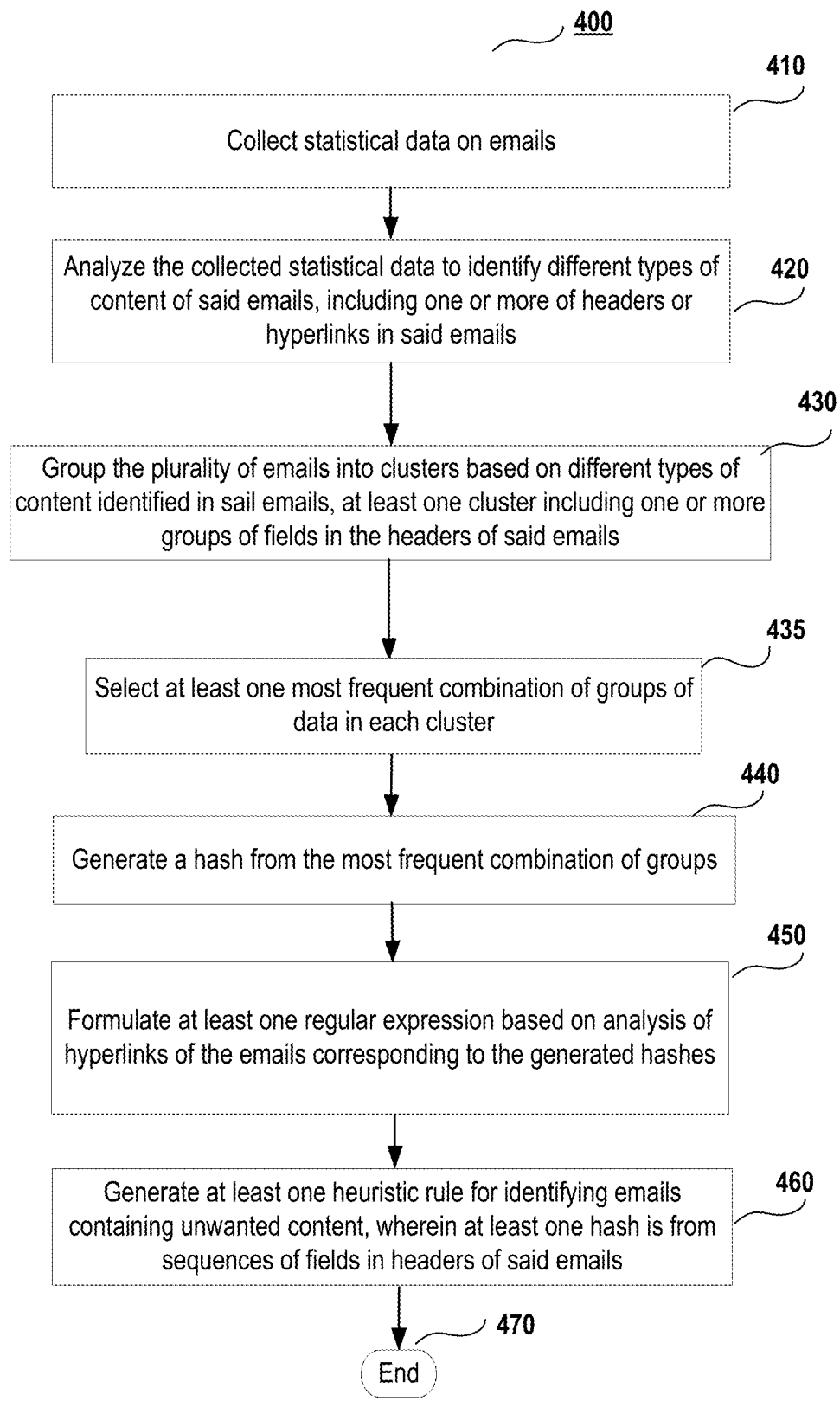
FIG. 4 is a flow diagram illustrating an exemplary method for forming heuristic rules for identifying emails including unwanted content.

FIG. 4 is a flow diagram illustrating an exemplary method 400 for forming heuristic rules that are used for identifying emails including unwanted content, e.g., spam. The method 400 is realized with the aid of the system 100. Suppose the system 100 has received an event indicating a need to create a heuristic rule for searching and identifying spam emails. Then, the method 400 is implemented to form the heuristic rules as described below.

In step 410, the method 400, using the data processor 110, collects statistical data on contents of a plurality of emails from the data gathering and storage device 170. The statistical data 160 is presented in a particular (pre-defined) form. For example, the statistical data may be presented containing information on an email in anonymous form, i.e., in such a way that the information of the client (e.g., client 180) and about the client was not determined. In FIG. 3, described above, an example of such statistical data for one email is presented. The data containing information about the header of the email is obtained, and some of the data is depersonalized and presented in the form of hashes.

In step 420, the method 400, by the data processor 110, analyzes the collected statistical data to identify different types of content of said emails, including one or more of headers or hyperlinks in said emails.

In step 430, the method 400, by the data processor 110, groups the plurality of emails into one or more clusters based on the different types of content identified in said emails, wherein at least one cluster includes one or more groups of fields in the headers of said emails. In one aspect, at least one cluster is formed with each cluster containing emails grouped by data types. In one aspect, one of the data types used to form the clusters is a data type for fields corresponding to headers of each email.

In one aspect, when one of the data types is for fields corresponding to headers of each email, in step 430, the method further performs an analysis of the obtained statistical data, wherein the analysis includes identifying at least a sequence of fields of the header of each email. Then, the method further forms clusters according to the fields using the identified at least one sequence of fields of the header of each email. The most preferred data clustering algorithm is used to form the clusters. In one aspect, the clusters are selected by trial and error, such as using the algorithm DBSCAN. An example of the formation of the clusters is described above in conjunction with FIG. 1.

In step 435, method 400, by the hash generator 120, selects at least one most frequent combination of groups of data in each cluster. The combination of groups is at least the series of the most frequent fields of the headers of the emails being analyzed. The most frequent combination is the set of fields which brings together the largest number of emails among those being analyzed. The hash is at least MD5, or a flexible hash of the combination of groups found. In one aspect, a specified threshold for the total number of figures being analyzed may serve as a basis for determining the most frequent combination of groups.

In step 440, method 400 generates a hash from the at least one most frequent combination of groups.

In step 450, method 400, using the regular expressions generator 130, formulates at least one regular expression based on an analysis of hyperlinks of the emails corresponding to the generated hashes. For example, the analysis may include an indication as to whether the emails contain unwanted content. The principle of forming the regular expressions was described above in conjunction with FIG. 1.

In step 460, method 400, using the heuristic rules generator 150, generates at least one heuristic rule for identifying emails containing unwanted content by combining at least one hash and the corresponding regular expression, wherein at least one hash is from sequences of fields in the headers of said emails. Each heuristic rule is generated by combining at least one hash and a regular expression corresponding to that hash, which has been previously formed. The correspondence is determined with the aid of the statistical data used to formulate the hash and the regular expression. Thus, one heuristic rule shall be formed for each previously created regular expression. Then, an evaluation of the generated heuristic rules is performed to identify at least one heuristic rule bringing together the largest number of emails corresponding to the cluster for which the heuristic rules were formed. The evaluation is done by comparing the generated heuristic rules to each other. As a result of this, one heuristic rule will remain, which describes the cluster the most completely. The method then proceeds to step 470 to end the process.

In one aspect, the method further includes performing a preliminary check for each hash on a collection of hashes containing only hashes for legitimate emails (i.e., emails that are not spam), whereby in the event of a match between the formed hash and a hash from the collection, the formed hash is removed from further processing and is not used for formation of the heuristic rule. If the hash does not match any hash from the collection of hashes, the method proceeds to the generation of heuristic rules.

In one aspect, the generated heuristic rule may also contain additional conditions which are also formed on the basis of the obtained statistical data 160, taking into account the main conditions that are already created.

In one aspect, the generated heuristic rule is verified on a collection of legitimate emails, and in the event that it does not match any email, the heuristic rule is sent on to the client 180 with the aid of the system 100.

In one aspect, the method further comprises performing a preliminary check for each hash on a collection of hashes containing only hashes for non-spam emails prior to generation of the heuristic rule, wherein the hash is used in the generation of the heuristic rule only when the preliminary check does not find a match with any hash of the collection of hashes.

In one aspect, each heuristic rule is generated by combining at least one hash and a regular expression corresponding to that hash which has been previously formulated.

In one aspect, each cluster contains emails grouped by data types, and wherein one of the data types used to form the at least one cluster is a data type for fields of the headers corresponding to each email.

In one aspect, the most frequent combination corresponds to a set of fields which bring together a largest number of emails together from among all the emails that are analyzed.

In one aspect, the most frequent combination is identified based on at least one of: a threshold established for a number of emails analyzed for the obtaining the statistical data, or exceeding or reaching a threshold for bringing together a predetermined percentage of the emails from which the statistical data is obtained.

In one aspect, the statistical data is obtained based on a lexical analysis of the emails.

In one aspect, the regular expressions are formulated based on the analysis of hyperlinks by: dividing each identified hyperlink into segments according to established dividers, for each hyperlink, computing a number of segments obtained by the division, comparing hyperlinks for which the number of segments is the same to each other, segment by segment, and combining the hyperlinks into regular expressions according to lengths of the hyperlinks, wherein if segments are identical, the segments are left unchanged, and if segments are different, the segments are transformed into a form in which only identical values remain.

In one aspect, the hash comprises at least an MD5 hash or a flexible hash of the most frequent combination of groups.

Figure 5:
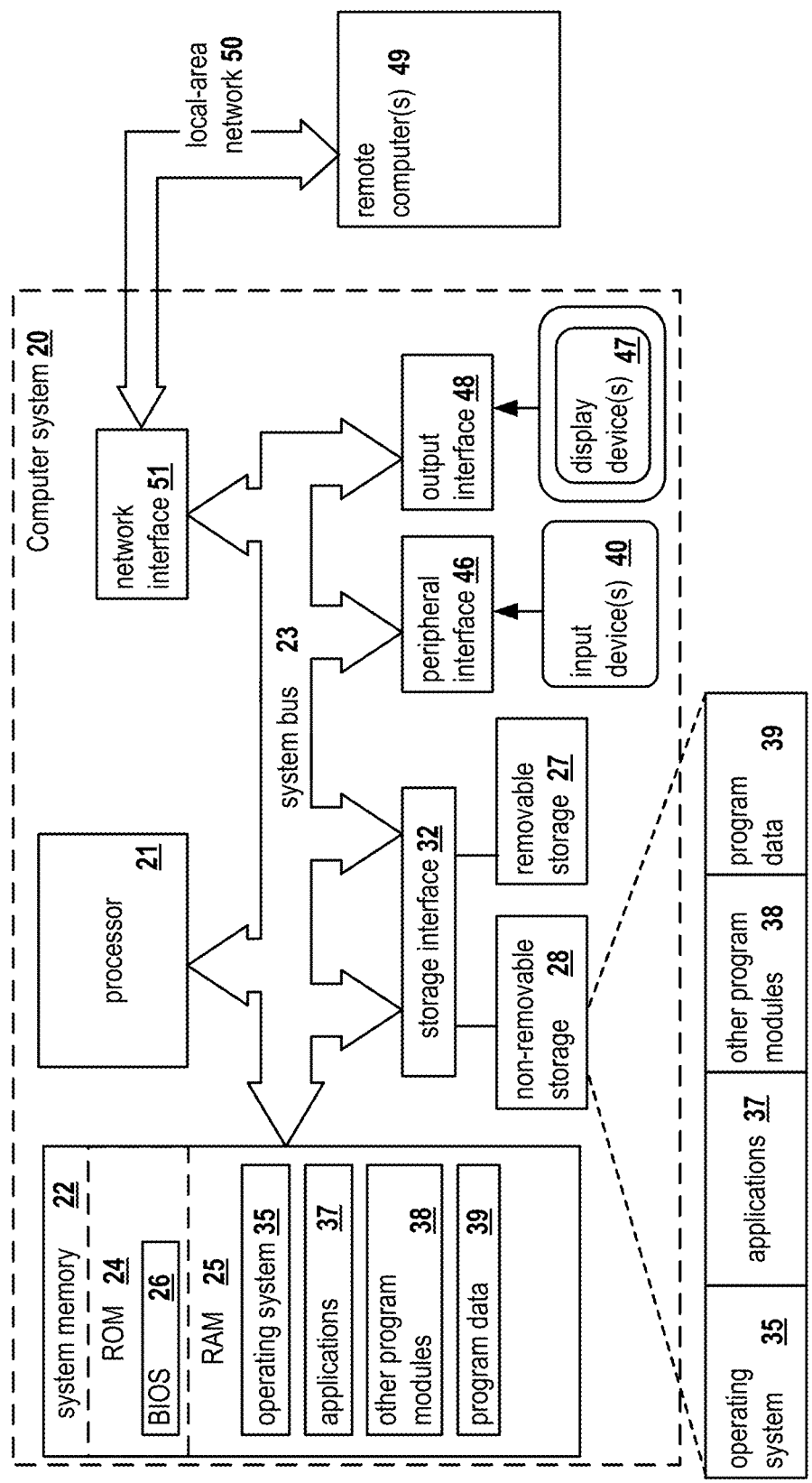
FIG. 5 presents an example of a general-purpose computer system on which aspects of the present disclosure can be implemented.

FIG. 5 is a block diagram illustrating a computer system 20 on which aspects of systems and methods for forming rules for identifying emails including unwanted content may be implemented in accordance with exemplary aspects. It should be noted that the computer system 20 can correspond to a detection device, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for generating heuristic rules for identifying spam emails based on fields in headers of emails, the method comprising:
   collecting, by a processor, statistical data on contents of a plurality of emails;
   analyzing, by the processor, the collected statistical data to identify different types of content of said emails, including one or more of headers or hyperlinks in said emails;
   grouping, by a processor, the plurality of emails into one or more clusters based on the different types of content identified in said emails, wherein at least one cluster includes one or more groups based on fields in headers of said emails;
   selecting, by the processor, at least one most frequent combination of groups of data in each cluster;
   generating, by the processor, a hash from the at least one most frequent combination of groups;
   formulating, by the processor, at least one regular expression based on an analysis of hyperlinks of the emails corresponding to the generated hashes; and
   generating, by the processor, at least one heuristic rule for identifying spam emails by combining at least one hash and the corresponding regular expression, wherein the at least one hash is generated based on fields in the headers of said emails.

2. The method of claim 1, wherein the regular expressions are formulated by:
   combining hyperlinks into regular expressions according to lengths of the hyperlinks, wherein only identical values of the hyperlinks being combined remain in the regular expression.

3. The method of claim 1, wherein the generation of the at least one hash further comprises:
   determining whether or not at least one set of groups of the cluster has reached a predetermined threshold; and
   combining a plurality of the hashes of the cluster when the predetermined threshold is not reached.

4. The method of claim 3, wherein the combining of the plurality of the hashes is performed using an or operation.

5. The method of claim 1, wherein the generation of the at least one hash further comprises:
   determining whether or not the generated at least one hash matches a hash stored in a database; and
   when the generated at least one hash matches a hash stored in the database, discarding the generated hash such that the hash is not considered for generating the at least one heuristic rule.

6. The method of claim 1, wherein at least one additional condition for the generating of the at least one heuristic rule is formed based on numbers of hyperlinks contained in bodies of emails that correspond to the cluster for which the hash was formed.

7. The method of claim 1, wherein at least one additional condition for the generating of the at least one heuristic rule is formed based on information contained in all the emails corresponding to the cluster for which the hash was formed.

8. The method of claim 1, further comprising:
   automatically identifying an event indicating a need to generate the heuristic rule, the event indicating at least one of: gathering a predetermined volume of statistical data, determination of at least one false alarm of the heuristic rule on one or more devices of clients, determination of a need to convert at least one previously created cluster.

9. A system for generating heuristic rules for identifying spam emails based on fields in headers of emails, comprising:
   at least one processor configured to:
      collect statistical data on contents of a plurality of emails;
      analyze the collected statistical data to identify different types of content of said emails, including one or more of headers or hyperlinks in said emails;
      group the plurality of emails into one or more clusters based on the different types of content identified in said emails, wherein at least one cluster includes one or more groups based on fields in headers of said emails;
      select at least one most frequent combination of groups of data in each cluster;
      generate a hash from the at least one most frequent combination of groups;
      formulate at least one regular expression based on an analysis of hyperlinks of the emails corresponding to the generated hashes; and
      generate at least one heuristic rule for identifying spam emails by combining at least one hash and the corresponding regular expression, wherein the at least one hash is generated based on fields in the headers of said emails.

10. The system of claim 9, wherein the regular expressions are formulated by:
    combining hyperlinks into regular expressions according to lengths of the hyperlinks, wherein only identical values of the hyperlinks being combined remain in the regular expression.

11. The system of claim 9, the processor being configured to generate the at least one hash further comprises the processor being configured to:
    determine whether or not at least one set of groups of the cluster has reached a predetermined threshold; and
    combine a plurality of the hashes of the cluster when the predetermined threshold is not reached.

12. The system of claim 11, wherein the combining of the plurality of the hashes is performed using an or operation.

13. The system of claim 9, wherein the processor being configured to generate the at least one hash further comprises the processor being configured to:
    determine whether or not the generated at least one hash matches a hash stored in a database; and
    when the generated at least one hash matches a hash stored in the database, discard the generated hash such that the hash is not considered for generating the at least one heuristic rule.

14. The system of claim 9, wherein at least one additional condition for the generating of the at least one heuristic rule is formed based on numbers of hyperlinks contained in bodies of emails that correspond to the cluster for which the hash was formed.

15. The system of claim 9, wherein at least one additional condition for the generating of the at least one heuristic rule is formed based on information contained in all the emails corresponding to the cluster for which the hash was formed.

16. The system of claim 9, the processor further being configured to:
    automatically identify an event indicating a need to generate the heuristic rule, the event indicating at least one of: gathering a predetermined volume of statistical data, determination of at least one false alarm of the heuristic rule on one or more devices of clients, determination of a need to convert at least one previously created cluster.

17. A non-transitory computer readable medium storing thereon computer executable instructions for generating heuristic rules for identifying spam emails based on fields in headers of emails, including instructions for:
   collecting, by a processor, statistical data on contents of a plurality of emails;
   analyzing, by the processor, the collected statistical data to identify different types of content of said emails, including one or more of headers or hyperlinks in said emails;
   grouping, by a processor, the plurality of emails into one or more clusters based on the different types of content identified in said emails, wherein at least one cluster includes one or more groups based on fields in headers of said emails;
   selecting, by the processor, at least one most frequent combination of groups of data in each cluster;
   generating, by the processor, a hash from the at least one most frequent combination of groups;
   formulating, by the processor, at least one regular expression based on an analysis of hyperlinks of the emails corresponding to the generated hashes; and
   generating, by the processor, at least one heuristic rule for identifying spam emails by combining at least one hash and the corresponding regular expression, wherein the at least one hash is generated based on fields in the headers of said emails.

18. The non-transitory computer readable medium of claim 17, wherein the regular expressions are formulated by:
   combining hyperlinks into regular expressions according to lengths of the hyperlinks, wherein only identical values of the hyperlinks being combined remain in the regular expression.

19. The non-transitory computer readable medium of claim 17, the instructions for generating the at least one hash further comprise instructions for:
   determining whether or not at least one set of groups of the cluster has reached a predetermined threshold; and
   combining a plurality of the hashes of the cluster when the predetermined threshold is not reached.

20. The non-transitory computer readable medium of claim 19, wherein the combining of the plurality of the hashes is performed using an or operation.

* * * * *